United States Patent
Sloyan et al.

(10) Patent No.: US 10,303,517 B1
(45) Date of Patent: May 28, 2019

(54) AUTOMATED EVALUATION OF COMPUTER PROGRAMMING

(71) Applicant: BrainFights, Inc., San Francisco, CA (US)

(72) Inventors: Tigran Sloyan, San Francisco, CA (US); Aram Shatakhtsyan, San Francisco, CA (US); Jan-Felix Desroches, San Francisco, CA (US); Eduard Piliposyan, Yerevan (AM)

(73) Assignee: BrainFights, Inc., San Francisco, CA (US)

( * ) Notice: Subject to any disclaimer, the term of this patent is extended or adjusted under 35 U.S.C. 154(b) by 104 days.

(21) Appl. No.: 15/418,371

(22) Filed: Jan. 27, 2017

Related U.S. Application Data

(60) Provisional application No. 62/288,312, filed on Jan. 28, 2016.

(51) Int. Cl.
G06F 9/46 (2006.01)
G06F 9/50 (2006.01)
G06F 11/36 (2006.01)

(52) U.S. Cl.
CPC .......... *G06F 9/505* (2013.01); *G06F 11/3688* (2013.01); *G06F 11/3692* (2013.01)

(58) Field of Classification Search
None
See application file for complete search history.

(56) References Cited

U.S. PATENT DOCUMENTS 5,297,150 A 3/1994 Clark
6,128,773 A 10/2000 Snider (Continued)

OTHER PUBLICATIONS

Sloyan, U.S. Appl. No. 15/418,417, filed Jan. 27, 2017, Office Action, dated May 9, 2018.

(Continued)

*Primary Examiner* — Gregory A Kessler
(74) *Attorney, Agent, or Firm* — Arluys IP, P.C.

(57) ABSTRACT

Techniques are described for analysis and evaluation of different computer programs developed by different users to accomplish programming tasks. A computer programming evaluation system provides users with one or more programming tasks and ability to input source code to solve the programming tasks. In an embodiment, using a client computer system, a user initiates a computer programming session with a programming system. As a result of the session, the client computer system is provided with user interface elements allowing the user to view one or more programming tasks and submit to the programming system source code for the one or more programming tasks. In an embodiment, different modes are used by the programming system to evaluate quality of the computer programming performed by a user in terms of accomplishing the programming task. By collecting result metrics from evaluations and comparing with complexity data of the programming tasks, the programming system generates a graph-based quantified knowledge map of computer programming for a user. Non-limiting examples of modes for evaluation of the computer programming include a practice mode, an arcade mode, versus mode, a bot mode and a bot training mode. In an embodiment, to execute source codes in parallel, a programming system may include multiple programming servers. Each programming server is a separate computer system that, in some embodiments, is a cloud computer system allocated from cloud services. Executing different instances of source code on different programming servers improves both the security and scalability of the programming system.

26 Claims, 6 Drawing Sheets

(56) References Cited

U.S. PATENT DOCUMENTS

| | | |
|---|---|---|
| 6,393,437 B1 | 5/2002 | Zinda |
| 7,480,900 B1 | 1/2009 | Zhou |
| 7,904,909 B1 * | 3/2011 | Reiner .................. G06F 9/5061 709/223 |
| 9,098,377 B1 | 8/2015 | Tibble |
| 9,471,468 B2 | 10/2016 | Broomhall |
| 2004/0205772 A1 | 10/2004 | Uszok |
| 2007/0116224 A1 | 5/2007 | Burke |
| 2009/0044264 A1 | 2/2009 | Ramanathan |
| 2009/0144698 A1 | 6/2009 | Fanning |
| 2009/0190676 A1 | 7/2009 | Nissani |
| 2011/0302657 A1 | 12/2011 | Ikegami |
| 2012/0272220 A1 | 10/2012 | Calcagno |
| 2012/0290950 A1 | 11/2012 | Rapaport |
| 2014/0013304 A1 | 1/2014 | Vangala |
| 2014/0123108 A1 | 5/2014 | Cheluvaraju |
| 2014/0282586 A1 | 9/2014 | Shear |
| 2015/0019640 A1 | 1/2015 | Li |
| 2015/0063556 A1 | 3/2015 | Uba |
| 2015/0143339 A1 | 5/2015 | Rajanna |
| 2015/0378863 A1 | 12/2015 | Balachandran |
| 2016/0034295 A1 * | 2/2016 | Cochran ............. G06F 9/45558 718/1 |
| 2016/0044380 A1 | 2/2016 | Barrett |
| 2016/0098287 A1 * | 4/2016 | Prasad ................ G06F 9/45558 718/1 |
| 2016/0154727 A1 | 6/2016 | Broomhall |
| 2016/0283362 A1 | 9/2016 | Seto |
| 2017/0075790 A1 | 3/2017 | Macleod |
| 2018/0136933 A1 | 5/2018 | Kogan |

OTHER PUBLICATIONS

"Github—remoteinterview/compilebox", github.com/remoteinterview/compilebox/tree/7586886f599615ac56fb1f7ac520aa78da932942, Published Oct. 18, 2015, Retrieved Jul. 17, 2017, 3 pages.

Sloyan, U.S. Appl. No. 15/418,342, filed Jan. 27, 2017, Office Action, dated Oct. 31, 2018.

* cited by examiner

US 10,303,517 B1

AUTOMATED EVALUATION OF COMPUTER PROGRAMMING

BENEFIT CLAIM

This application claims the benefit under 35 U.S.C. § 119(e) of provisional application 62/288,312, filed Jan. 28, 2016, the entire contents of which is hereby incorporated by reference for all purposes as if fully set forth herein.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

TECHNICAL FIELD

The presented approach relates to compilation, execution and evaluation of computer code on computer systems, specifically to automated evaluation of computer programming. SUGGESTED ART UNITS: 2192, 2193; SUGGESTED CLASSIFICATIONS: 717/124, 717/126, 717/136.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Integrated development environment systems (IDEs) provide software developers with computer programming tools to aid for example, developing, debugging and compiling source code of computer programs. Given a programing task, a developer can utilize IDE to develop a computer program that accomplishes the task. However, the accuracy and quality of the developed program may not be readily ascertained by IDE, leaving the developer clueless about the quality of the developed program.

One solution for testing accuracy of computer programs may be to utilize a separate set of tools in addition to IDE. Such tools may include automated test tools. Accordingly, while IDE may verify that developed source code for a task could be executed as a program, the automated test tools may verify that the program indeed accurately accomplishes the task. However, using the automated test tools to verify that a computer program performs a particular task may require a comprehensive manual configuration of the automated test tools. For example, test cases that contain inputs and expected outputs of a program may need to be manually entered into the automated test tools to properly test the program.

More importantly, neither IDE nor automated test tools may be able to evaluate the quality of computer programming of a computer program. Particularly, traditional systems lack metrics and automation to compare programs developed by different software developers. Developers that are assigned the same task may write different source code from perhaps endless permutations of source code that could accomplish the task at hand. Although the programs developed by developers may pass the test cases, the source code generated by different developers may be vastly differ in quality.

DETAILED DESCRIPTION

Figure 1:
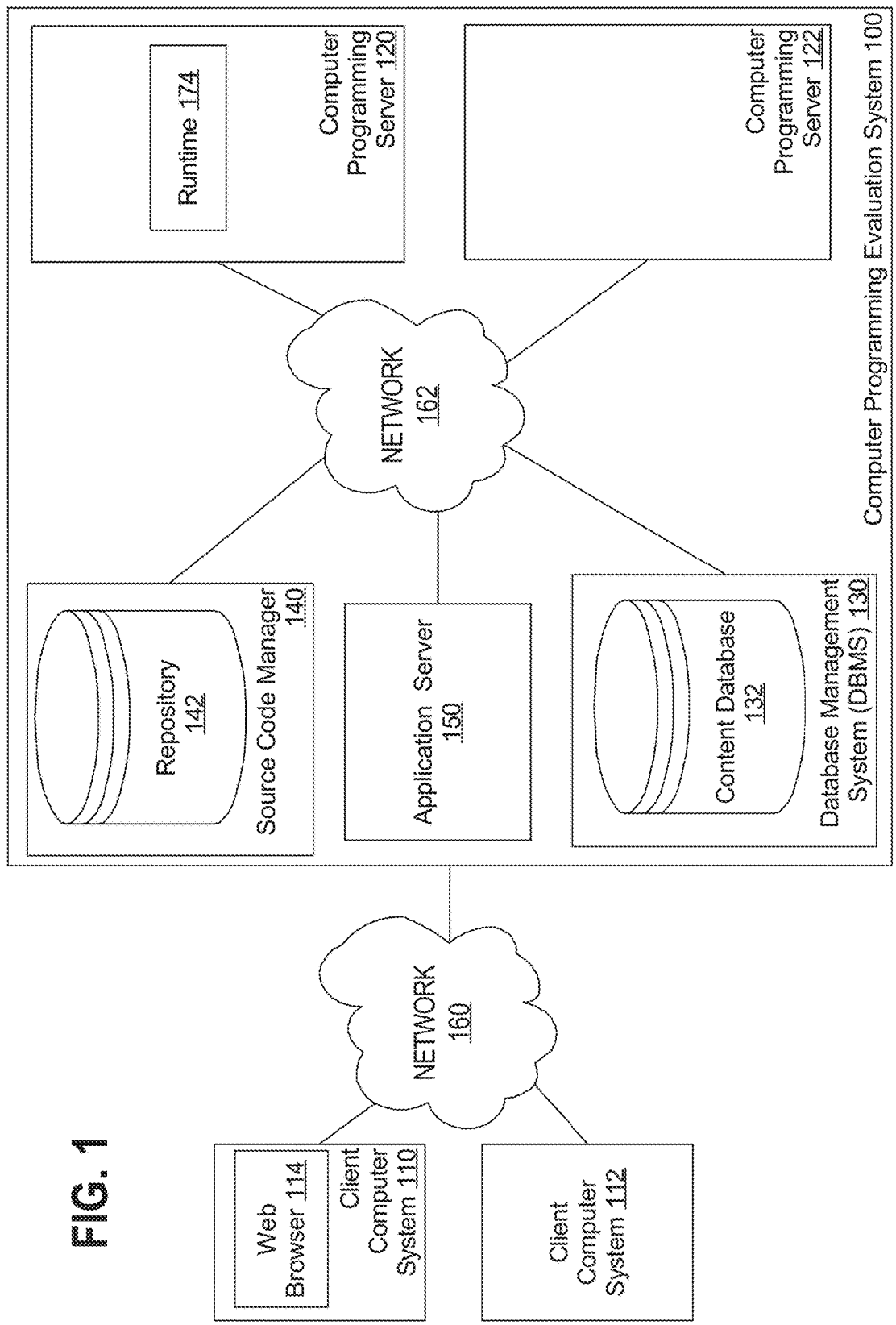
FIG. 1 is a block diagram that depicts a computer programming evaluation system 100, in an embodiment.

In the following description, for the purposes of explanation, numerous specific details are set forth in order to provide a thorough understanding of the presented approach. It will be apparent, however, that the presented approach may be practiced without these specific details. In other instances, well-known structures and devices are shown in block diagram form in order to avoid unnecessarily obscuring the presented approach.

General Overview

Techniques are described for analysis and evaluation of different computer programs developed by different users to accomplish programming tasks. A computer programming evaluation system ("programming system") provides users with one or more programming tasks and ability to input source code to solve the programming tasks. The term "programming task" refers to data describing a well-defined problem statement for which a user may be asked to develop source code.

In some embodiments, a programming task includes source code to be modified to resolve a problem. Source code may be in one or more programming languages. The term "programming language" refers herein to a formally defined language designed to communicate instructions to a computer system or designed to describe a presentation and/or manipulation of data in a particular framework/environment that runs on a computer system. Non-limiting examples of programming languages are C++, C, Java, JavaScript (JS), Python, Cascading Style Sheets (CS S), Sequel Query Language (SQL) and HyperText Markup Language (HTML).

In an embodiment, using a client computer system, a user initiates a computer programming session with a programming system. As a result of the session, the client computer system is provided with user interface elements allowing the user to view one or more programming tasks and submit to the programming system source code for the one or more programming tasks.

Upon receiving source code from a client computer, the programming system may compile the source code into a program. For the programming languages that do not require compilation, the programming system may load the programming environment corresponding to the programming language, and may run the source code as a program in the loaded programming environment. The term "executing a source code (or instance(s) of source code)" refers herein to converting the source code into a program by compiling the source code and/or loading a programming environment for the source code and executing the program on a computer system. The programming system may execute the source code using test case data as an input and collect the output of the one or more executions.

Executing user submitted instances of source code by a programming system may present security challenges for the programming system. In particular, since user submitted instances of source code may contain any arbitrary instructions for a programming system to execute, and such instructions have a potential to exploit the security of the programming system. For example, executing the submitted source code may over subscribe to computing resource of the programming system, thus starving other processes on the programming system from execution, may cause damage to the data accessible to the programming system and/or even hijack the programming system itself to perform malicious tasks on other accessible systems.

Additionally, executing such source code may cause the programming system to gain access to test data and/or spoof results for evaluating the quality of the source code or affect the evaluations of other source codes.

Apart from the security challenges with executing instances of source code on a programming system, the programming system need to ensure the scalability for simultaneously execution of multiple instances of source code. Multiple user client computers may have con-current programming session with the programming system, and the programming system may receive the request for execution from one programming session while still executing source code from the other programming session.

The scalability problem is further exacerbated when the execution time of a source code is a metric for evaluation of the source code quality. In such an embodiment, the programming system needs to ensure that the received source codes are executed using the same (or similar computing resources) even when such requests are concurrently received.

In an embodiment, a programming system may include multiple programming servers to execute source codes in parallel. Each programming server is a separate computer system that, in some embodiments, is a cloud computer system allocated from cloud services. Executing different instances of source code on different programming servers improves both the security and scalability of the programming system.

In the embodiment in which multiple source code execution requests are received from different concurrent programming sessions, the programming system determines which programming servers out of multiple programming servers are going to process the requests. The determination may be based on load balancing and performance tuning of source code execution requests among multiple programming servers. In an embodiment, the load may be determined based on selectability metrics that measure the stability and utilization of a programming server. Based on the determination, the programming system routes the source code execution requests to the appropriate programming server. Accordingly, one programming server may be executing source code from one of the received requests concurrently with another programming server executing another of the received requests.

In an embodiment, the programming system automatically retrieves test data corresponding to the programming task for which the source code was received and executed, and validates the accuracy of the program generated from the source code provided by a user. If any failure occurs, the programming system provides an indication of the failure to the client computer.

In an embodiment, different modes are used by the programming system to evaluate quality of the computer programming performed by a user in terms of accomplishing the programming task. By collecting result metrics from evaluations and comparing with complexity data of the programming tasks, the programming system generates a graph-based quantified knowledge map of computer programming for a user. Non-limiting examples of modes for evaluation of the computer programming include a practice mode, an arcade mode, a versus mode, a bot mode and a bot training mode.

In a practice mode, the result of the evaluation may be based on the metrics collected from a computer programming session established with the user and the complexity information determined for the one or more programming tasks performed during the computer programming session. The programming system may generate metrics based on data from pre-compile time, compile time and/or run-time, in an embodiment.

In an arcade mode, programming tasks are grouped by their respective general subject area and are arranged in the increasing complexity in each of the groupings, in an embodiment. A user may request the next programming task only after the evaluation of the source code execution request for the previous programming task yields satisfactory result metrics (or "solution rating(s)" as discussed further below). Thus, not all programming tasks are available to the user's programming session at once. A user has to "unlock" programming tasks by user's adequate performance for the previous, less complex, tasks in the same general subject area.

In a versus mode, which is similar to the practice mode, a result of the evaluation may be based on the metrics collected from the user's computer programming session and the complexity information determined for the one or more programming task in the computer programming session. The evaluation may be further based on metrics collected from another computer programming session of at least another user for performing the same one or more programming tasks. Accordingly, the evaluation result for the user may not only depend on the computer programming of that user, but also the computer programing of at least another user. The other user is referred herein as an "opposing user."

In an embodiment, through user interface elements, a user requests or selects an opposing user at the time of establishing a programming session in the versus mode. In another embodiment, one or more opposing users may be assigned to the user by the programming system. For example, when a user selects to join a programming tournament running at the programming system, the programming system may assign opposing users to the user based on configuration data of the tournament.

A bot mode of evaluation is similar to the versus mode, however, in the bot mode, instead of comparing the computer programming of a user with an opposing user, the user's computer programming is compared with a bot. The term "bot" refers to a collection of metrics collected by the programming system that reflects computer programming of a particular group of users associated with an entity. In one embodiment, the particular group of users are one or more developers who are employed by a particular corporate entity, or one or more developers who are students at a particular educational institution.

The term "training a bot" refers to collecting metrics from one or more programming sessions initiated by a particular group of users with which the bot is associated. In an embodiment, one or more users of the group establish programming sessions with the programming system for a bot training. The programming system assigns the users one or more programming tasks associated with the bot. The users submit source code using user interfaces at client computer systems, and the programming system evaluates the source code and associates the metrics collected from the programming sessions with the bot.

In an embodiment, the programming system includes a client computer system, which is used by a user, and which comprises user interface elements permitting the user to choose the mode for evaluation of computer programming. The programming system may present a programming task to the user based on the selected mode.

System Overview

FIG. 1 is a block diagram that depicts computer programming evaluation system 100, in an embodiment. Computer programming evaluation system (programming system) 100 includes application server 150. Application server 150 serves as an interface of programming system 100. Client computer systems 110 and 112 connect to programming server 120 to establish programming sessions for computer programming server 120 or 122 to execute instances of source code received in the sessions. In an embodiment, application server 150 is connected with the other components of programming system 100 through network 162, which is internal to programming system 100.

In an embodiment, client computer systems 110 connects with application server 150 to establish programming sessions through network 160. Application server 150 may provide client computer system 110 and 112 user interface elements based on content data obtained from content database 132. Application server 150 connects to DBMS 130 through network 160 and queries DBMS 130 for the content data from content database 132. In addition to the content data, content database 132 may also store information about users of programming system 100.

Network 160 and 162 broadly represents a digital data telecommunications network comprising any combination of a local area network (LAN), a wireless LAN (WLAN), a wide area network (WAN), a wireless WAN (WWAN), a metropolitan area network (MAN), an ad hoc network, an intranet, an extranet, a virtual private network (VPN), a portion of the Internet, the Internet, a portion of a public switched telephone network (PSTN), or a cellular network.

In an embodiment, web browser 114 on client computer system 110 may receive the information from the application server 150 through network 160. Using the information, web browser 114 may display an IDE environment to the user of client computer system 110 to input source code for a programming task. A user may submit an instance of source code to application server 150 through the established programming session between web browser 114 and application server 150. Once received, application server 150 may request a programming server, such as computer programming server 120 or 122, to execute the instance of the source code.

In one embodiment, application server 150 determines which programming server to request to execute the received instance of source code according to techniques described herein. In another, embodiment, application server 150 deploys a new programming server for the execution according techniques described herein. Although only computer programming servers 120 and 122 are depicted in FIG. 1, in a practical environment there may be many more, perhaps hundreds or thousands, of programming servers sharing the load of the programming sessions.

To execute an instance of source code, a programming server, such as computer programming server 120 or 122, schedules the source code to be executed by a secure runtime environment such as runtime 174, in an embodiment. Computer programming server 120 upon receipt of an instance of source code may request runtime manager (not depicted in FIG. 1) to stop previous runtime 174 and spawn a new secure runtime environment according to techniques described herein.

In addition to the instance source code, a programming server, such as computer programming server 120 or 122, may receive from application server 150 information on the programming task for which the instance of source code was submitted. In an embodiment, repository 142 of programming system 100 stores programming tasks that are served to users. Application server 150 connects to source code manager 140 to request programming task data for one or more programming tasks.

Programing task data may contain source code of a programming task written in one or more programming languages. The programing task data may also include programming task description, program bug data, complexity data, test case data, and/or other data to describe the programming task. The programming task data that excludes source code is referred herein as "programming task metadata." In an embodiment, programming task metadata of a programming task may be encoded in the source code of the programming task in a form of one or more comments.

In an embodiment, source code manager 140 is mounted as a file system at a mount point of computer programming servers 120/122. In an embodiment, to improve security and further isolate execution of user submitted source codes from having an access to modify programming task data, only application server 150 has access to the repository 142 and not any of programming servers and/or runtime environments. In such an embodiment, for a source code execution request, application server 150 retrieves test case data for the corresponding programming task and sends the data in addition to the received source code to computer programming server 120 or 122.

Programming task data, such as test case data, may be retrieved by issuing file system requests for one or more files stored in repository 142. A file system request may include a request to the mount a programing point in computer programming server 120 or application server 150. In another embodiment, programming task data stored in repository 142 is replicated onto a file system accessible by programming system 100.

For example, programming task data for the "Almost Increasing Sequence" programming task may be stored in a folder structure in repository 142. Root folder, "almostIncreasingSequence," may contains "almostIncreasingSequence.cpp" file that contains source code of the programming task in the C++ programming language, "almostIncreasingSequence.java" file that contains source code of programming task in the Java programming language, "almostIncreasingSequence.js" file that contains source code of programming task in the JavaScript programming language, and "almostIncreasingSequence.py" file that contains source code of programming task in the Python programming language. The folder may further contain "meta.json" file that contains programming task metadata in JSON semi-structured data format.

Programming Tasks

In an embodiment, a programming task is automatically generated from data stored in repository 142. Programming system 100 identifies the programming task to be used in a computer programming session and retrieves the programming task data for the programming task. Additionally, programming system 100 may generate initial source code for one or more programming languages to present to the user with the programming task.

In an embodiment, a programming task is related to debugging source code that includes one or more inaccuracies, bugs. Programming system 100 may generate the programming task from the inaccurate source code stored in repository 142 and may present the inaccurate source code to a user along with the description of the programming task and user interface elements permitting the user edit the source code to correct the inaccuracies.

In another embodiment, the source code stored in repository 142 is accurate. Programming system 100 automatically generates one or more bugs and modifies the accurate source code before presenting the programming task to the client computer system of the user. Programming system 100 may analyze the metadata for the programming task and/or the accurate source code to modify the source code to introduce the one or more inaccuracies.

Example 1 below is an example of a source code snippet for the "Almost Increasing Sequence" programming task:

```
/*      @Example
8       * for [1, 3, 2, 1] output should be false
9       * for [1, 3, 2] output should be true
10      */
11      function almostIncreasingSequence(sequence) {
12
13          for (var erasedIndex = 0 ; erasedIndex < sequence.length ; erasedIndex++) {
14              var increasing = true,
15              //1//var increasing = false,
16              last = 0,
17              start = 1;
18
19              if (!erasedIndex) {
20                  last = 1;
21                  start = 2;
22              }
```

Example 1

To automatically generate the programming task with inaccurate source code, a uniquely formatted comment is inserted on line 15. The comment is uniquely formatted to start with "//1//" to identify for programming system 100 the inaccuracy to be generated. Based on the comment, programming system 100 replaces line 14 with line 15, while stripping away the prefix "//1//".

A programming task may also be related to a recovery of one or more portions of source code in a presented incomplete source code. Programming system 100 presents, to a user, incomplete source code with one or more portions of the source code missing and user interface elements permitting the user to implement the one or more missing portions of the source code, in an embodiment. Programming system 100 may also present to the user the programming task description for the source code that directs the user to implement the one or more missing portions of the incomplete source code. A programming task with a single missing portion of source code is referred herein as a "single recovery" programming task, while a programming task with multiple missing portions of source code is referred herein as a "multi-recovery" programing task.

In a related embodiment, programming system 100 may present multiple source code portions for a missing portion and allow a user to select one of the multiple source code portions for the evaluation of programming task. The available multiple source code portions may be presented on a user interface as a drop-down user interface element with an element of the dropdown having a different portion of source code. A programming task may have a single or multiple missing source code portions with one or more sets of multiple source code portions available for selection in lieu of the missing source code portion(s). Programming system 100 may receive the user selection of one of the available missing source code portions and evaluate the source code with the selected source code portion(s) using test case data. Alternatively, programming system 100 may receive the one or more user selections and may generate evaluate the source code based on the user selections.

To present the user with the recovery related programming tasks, programming system 100 may similarly store the source code in repository 142. The stored source code may or may not contain the missing source code portion. If the stored source code contains the missing source code portion, then the missing source code portion is denoted with special markings such as special in-line comments. Programming system 100 generates the programming task by analyzing the source code and removing the missing portion of the source code based on the special markings.

In another embodiment, a programming task may be related to re-shuffling lines of source code. Programming system 100 presents, to a user, a source code with one or more portions of the source code re-arranged in an incorrect order. In one embodiment, a user may edit the presented source code to re-arrange any portion of the source code. Programming system 100 may receive the re-arranged source code and may use test case data to generate result data for the re-arranged source code. In another embodiment, one or more user interface elements may represent portions of the source code, and programming system 100 may configure the user interface to allow the user to re-arrange those portions within the source code. Programming system 100 may receive one or more user selections and may generate the result data for the source code based on the user selections or based on evaluating the source code using test case data.

In another embodiment, a programming task is to implement source code from scratch. Programming system 100 presents, to a user, user interface elements permitting the user to implement the source code from scratch. In such an embodiment, programming system 100 may not store any source code for the programming task in repository 142. In the embodiment in which programming system 100 does store accurate source code for the programming task, programming system 100 retrieves the programming task description from programming task metadata stored in repository 142 without retrieving the stored source code. Programming system 100 presents to the user the programming task description directing the user to implement source code for the programming task, while the stored source code itself is not provided to the user.

Programming Task Categories

In an embodiment, a task, such as a programming task, may be categorized based on the specific subject area to which the task is directed. For example, if solving a programming task requires knowledge in an area of regular expressions for strings, then the task is tagged with data indicating the subject area of regular expressions. The "subject tag" may be stored as part of programming task metadata described above. The term "subject tag" refers to a tag that describes the subject area of the task that is pre-determined based on perceived knowledge required for a user to solve the task. A single task may be associated with multiple subject areas and thus may be tagged with multiple subject tags in the task metadata (e.g. programming task metadata).

A task may require general knowledge in a particular general subject area or may be solved using multiple approaches that cannot be categorized into a specific subject area. For example, a programming task to implement a source code from scratch may have numerous correct solutions and thus, may not be accurately categorized into a specific subject area. Accordingly, such programming task may be tagged with subject tag(s) that describe general subject area. For example, a programming task may be directed to writing a general string manipulation source code in which usage of regular expressions or other particular subject area knowledge may not be specifically required. Such programming task may be tagged with a subject tag indicating general subject area of string manipulation. A programming language may also be a general subject area and the tasks that require a particular programming language for source code may also be tagged with a subject tag indicating the required programming language.

In the embodiment in which a bot mode of evaluation is used, a programming task may be specific to the bot selected by a user. Particularly, the programming tasks may have a specific subject areas related to an entity with which the bot is associated. The programming tasks may be tagged with corresponding subject tags that may additionally include the entity description.

In the bot mode, the programming task is intended to represent practical programming tasks that programmers of the entity usually encounter. For example, if a bot is related to a corporate entity that produces routing software for navigation, programming system 100 selects programming tasks related to routing algorithm. In another example, if a bot is related to a corporate entity that produces software for synchronizing files between a server and a client computer system, then programming system 100 selects programming tasks related to network based data transfers. In an embodiment, the programming tasks related to a particular bot are not used for another bot and/or for computer programming sessions in a different mode of evaluation.

A task, regardless of the mode in which it is used, may be associated with one or more ratings that indicate the difficulty of the task. The term "subject complexity rating" refers herein to a rating (e.g. numerical value(s)) that represents the difficulty of solving the associated task relative to other tasks in the subject area. In an embodiment, a separate subject complexity rating is assigned for each subject tag associated with the task. The subject complexity rating may be a range of numerical values indicating that the difficulty of the task in the specified subject area is not concise and may be anywhere within the specified range. The subject complexity rating(s) for a task may be stored in the complexity data of task metadata for the task in association with the corresponding subject tag(s).

Example User Interface for Source Code Input

Figure 2:
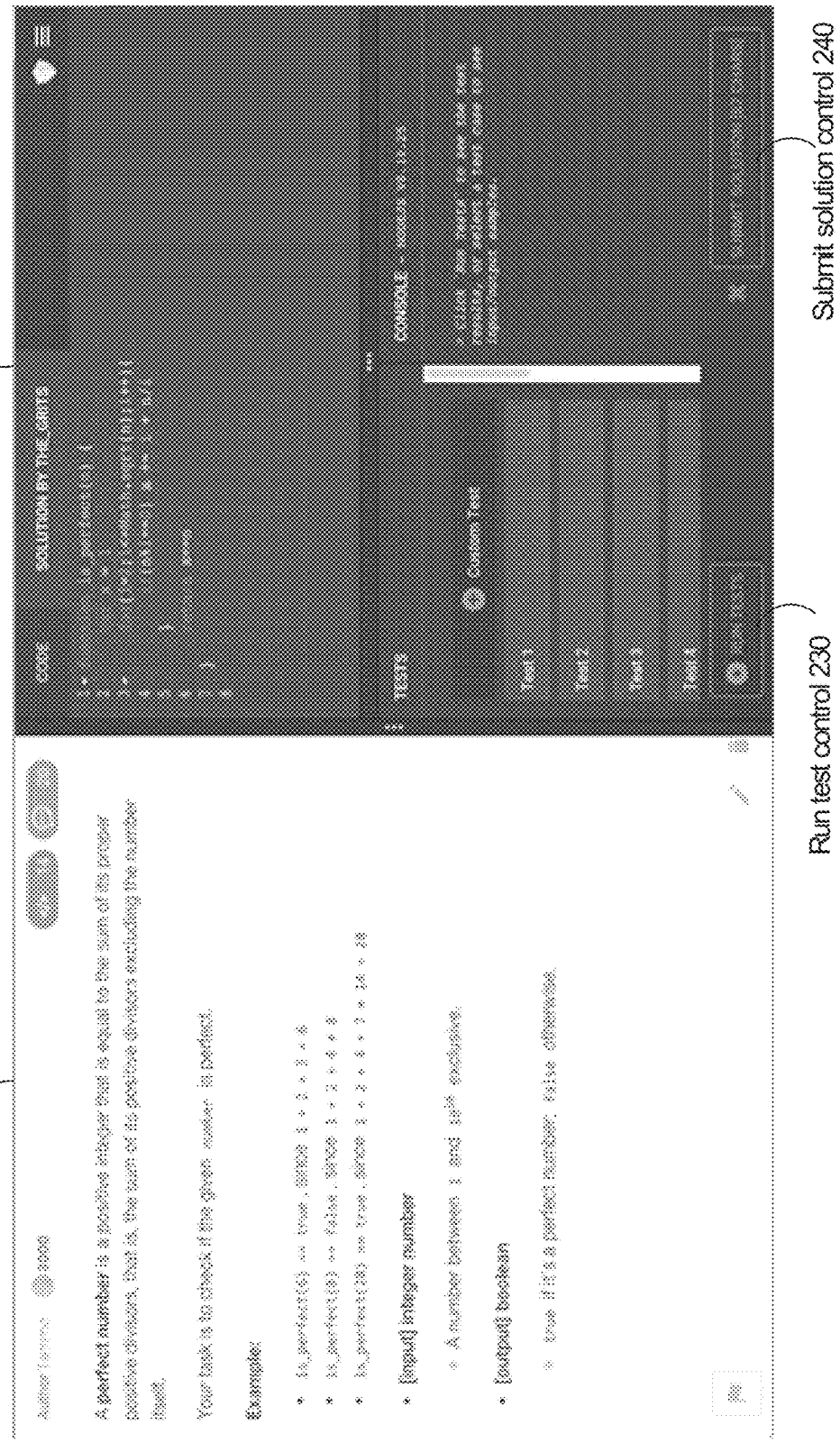
FIG. 2 illustrates an example graphical user interface for viewing a programming task and editing source code, in an embodiment.

FIG. 2 illustrates an example graphical user interface to view a programming task and edit source code, in an embodiment. Programming task description 210 describes the programming task to a user, while source code editor 220 initially displays initial source code for the programming task if any. As discussed above, if initial source code exists, the source code may contain one or more inaccuracies or may be incomplete. Source code editor 220 permits the user to modify or add source code to implement the solution for the programming task. Run test control 230, when selected, executes tests cases to test the source code entered in source code editor 220. Submit solution control 240 submits the source code in source code editor 220 to programming system 100 for evaluation.

Testing Programs

In an embodiment, programming system 100 executes submitted source code for evaluation. A client computer system may submit modified source code to programming system 100 for an evaluation. To test source code, programming system 100 may retrieve test case data for the programming task from programming task metadata stored in repository 142. Programming system 100 may pre-fetch test case data at the time when a programming session is established for the programming task or when the source code is received by programming system 100. In another embodiment, test case data for the programming task may be submitted with the source code.

In an embodiment, test case data for a programming task may contain one or more test cases that describe input data and expected output data for the program of the programming task. In another embodiment, test case data may contain information for generating such test cases. Using the information from the test case data, programming system 100 may generate thousands perhaps millions of test cases for the programming task.

Example 2 below contains information in JSON semi-structured data format for programming system 100 to generate test cases:
{
Input: {
    testGen: matrixMaker
    size: 10^6×10^6
    type: integer
    upperBound: 10^4
    lowerBound: −10^4
Output: true
}

Example 2

Upon receiving source code, programming system 100 identifies the programming task for which the source code has been submitted and the programming language of the source code. Application server 150 retrieves the test case data for the programming task to be submitted with the source code for execution by a programming server such as programming server 120 or 122.

Routing a Source Code Execution Request

The submission of source code execution requests may need to be queued for programming servers, particularly when source code execution requests are received while the previous source code execution requests are still being evaluated.

In an embodiment, multiple con-current programming sessions are established with programming system 100. Accordingly, application server 150 receives multiple source code execution requests through the established multiple con-current programming sessions. In one embodiment, application server 150 maintains an evaluation queue for programming system 100 and may add an entry for each received but not yet executed source code execution request in the order of the receipt. Application server 150 may submit source code execution requests to programming servers for evaluation based on the order of the corresponding entries. In another embodiment, the entries may be associated with a timestamp of the receipt, and the corresponding source code execution requests may be submitted according to the timestamps. Once a source code execution request is evaluated, the corresponding entry may be removed from the system queue.

Figure 3:
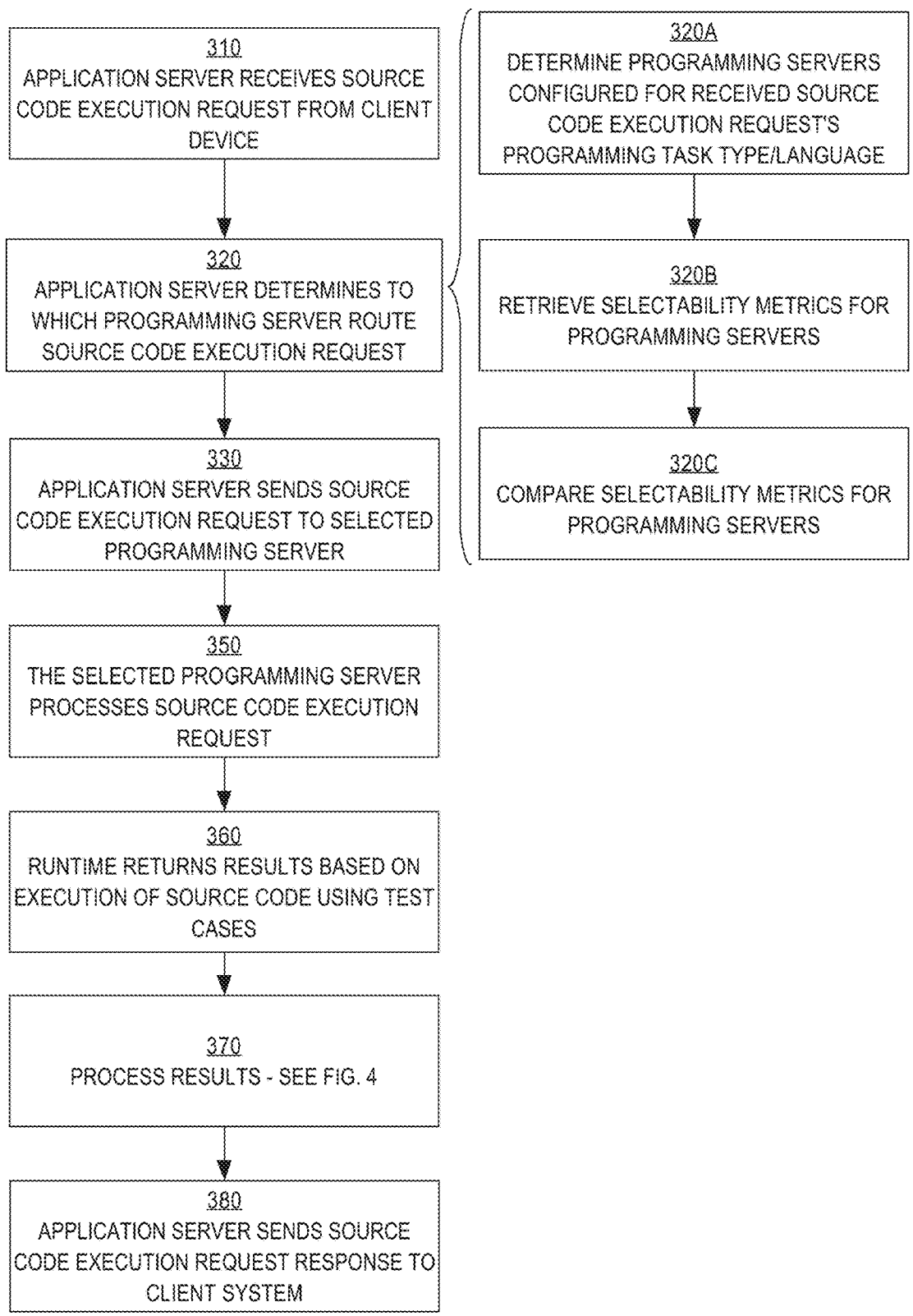
FIG. 3 is a flow diagram that depicts a process for processing a received source code execution request by a programming system, in an embodiment.

FIG. 3 is a flow diagram that depicts a process for processing a received source code execution request by a programming system, in an embodiment. At block 310, a process, such as a process executing in application server 150, associates the received source code execution request with the corresponding programming task data. The process may route the source code execution request as well as the associated programming task data to one of the programming servers of a programming system for an evaluation.

In an embodiment, at block 320, the process determines which programming server of the programming system to route the source code execution request. The process may select a programming server to route the source code execution request based on one or more criteria or factors.

In an embodiment, one criterion for determining which programming server to route a source code execution request is the type of the programming task for which the source code execution request was received by the application servers. At block 320A, the process may determine which set of one or more programming servers are configured to process received source code execution request's programming task type and/or source code execution request's source code language.

To expedite provisioning of programming servers in a programming system and to improve the maintenance of the programming servers, each programming server may be configured to evaluate source code instances for one or more specific types of programming tasks. Doing so, alleviates the need for maintaining different types of language-based runtime environments on a same programming server. For example, to evaluate a source code request containing a database query, a database management system has to be maintained at a programming server. Similarly, for a user interface related source code instances, a web server needs to be executing on the programming server; while for each of the different programming language source codes, a respective compiler and/or language-based runtime environment needs to be loaded by the programming server.

Accordingly, as non-limiting examples, a set of programming servers may be configured and dedicated to evaluate source code instances for database related programming task; another set of programming servers may be configured and dedicated to evaluate source codes for web user interface related programming tasks; other sets of programming servers may be configured and dedicated to evaluate respective source codes instances in a particular programming language or a particular group of languages; or any combination of the above mentioned criteria.

Server Selectability Metrics

In an embodiment, other criteria for selecting a programming server are based on "server selectability metrics." The term "server selectability metrics" refers herein to metrics collected from a programming server that measure its ability to successfully evaluate a new source code execution request. As such, non-limiting examples of server selectability metrics include one or more of:
- a current number of source code requests assigned to a programming server,
- an average number of source code requests assigned to a programming server (within a particular time period),
- a time period duration for returning result(s) for one or more (latest) source code requests at a programming server, and
- error rate of execution of instances of source code on a programming server.

In an embodiment, server selectability metrics further include the performance metrics for the current load of a programming server. Non-limiting examples of performance metrics include one or more of the following: CPU usage of a programming server, memory usage of a programming server, and I/O usage of a programming server.

Server selectability metrics may be received by the application server in multiple ways. For example, each of the programming servers may be configured to automatically and regularly (e.g., every five seconds) transmit such statistics to the application server. As another example, the application server receives statistics only after issuing requests for such statistics to each of the programming servers. Such requests may be sent in response to the application server receiving a source code execution request.

In an embodiment, another source for server selectability metrics is a programming server queue. The term "programming server queue" refers to a queue-based data structure of entries, in which each entry represents a source code execution request assigned to a programming server but not yet selected for an evaluation. The programming server queue is maintained by adding an entry for each received but not yet executed source code execution request in the order of the receipt. Programming server may process source code execution requests in the order of the corresponding entries. In another embodiment, the entries may be associated with a timestamp of the assignment to the programming server, and the corresponding source code execution requests may be selected for an evaluation according to the timestamps. As source code execution requests are evaluated, the corresponding entries may be removed from the programming server queue changing the queue-based selectability metrics.

In an embodiment, at block 320B, the process may retrieve one or more selectability metrics, such as queue sizes for programming servers of programming system 100, and at block 320C, compare the corresponding metrics to determine which programming server to assign the received source code request.

Load Balancing

In an embodiment, at block 320, the process determines which programming server to assign the received source code execution request using one or more load balancing techniques that are performed on programming servers. Load balancing of a programming system involves assigning source code execution requests to each of the programming servers of the programming system such that each of the programming servers is assigned an equal number of source code execution requests (e.g., two source code execution requests each) or such that no programming server has two or more source code execution requests assigned to it than are assigned to any other programming server (e.g., two source code execution requests to programming server and three source code execution requests to another programming server). In one embodiment, the application server may use a round-robin technique of sequentially assigning programming servers source code execution requests as they are received by the application server. In such an embodiment, for con-current programming sessions, application server 150 may assign source code execution requests from the sessions in batches. Accordingly, if one source code execution request is assigned to one programming server, then the other source code execution request may be assigned to another programming server.

Load balancing of programming system may occur in response to one or more events. Non-limiting examples of such events include the removal of a programming server from programming system and an addition of a programming server to programming system.

Non-limiting examples of load balancing criteria include the number of source code execution requests assigned to each of the programming servers, the number of source code execution requests each of the programming servers is currently processing and/or queuing, and an estimated (or actual) cost of processing a source code execution request of one programming server compared to another programming server.

For example, if programming server is assigned five source code execution requests while another programming server is not assigned any source code execution requests (or has not been assigned web requests for a certain amount of time), then one or more of the five source code execution requests assigned to programming server are assigned to the other programming server.

Performance Tuning and New Programming Server Deployment

In an embodiment, the application server of a programming system applies one or more performance tuning techniques when determining how to route a source code execution request. Load balancing and performance tuning are related. While load balancing involves distributing load (reflected by the number of source code execution requests assigned to each programming server) evenly among programming servers, performance tuning is generally concerned with immediate performance and may involve considering additional factors, such as the type of client driver that initiated the source code execution request. Thus, performance tuning tends to be more complicated than load balancing.

Performance tuning may be accomplished using software that monitors certain factors such as selectability metrics. Performance tuning software executing on the application server (and/or one or more of programming servers) determines how to re-assign source code execution requests based on certain heuristics. An example of a heuristic is if the CPU (i.e., Central Processing Unit) usage on a particular programming server reaches 90%, then at least one source code execution request assigned to the particular programming server is re-assigned to another programming server. Alternatively, performance tuning software implements more sophisticated logic, such as a probabilistic model, examples of which include Markov networks and Bayesian networks. Such a probabilistic model accepts multiples inputs, such as I/O throughput, memory (e.g., RAM) usage, CPU usage), and network usage. Based on the probabilistic model, the performance tuning software might determine if a programming server is likely to have a problem serving additional source code execution requests and might spread out the remaining source code execution requests as well as re-assign currently running source code execution requests to better distribute the load among the entire programming system.

For example, a programming server of programming system is assigned two source code execution requests: request1 and request2. Request1 is to fetch a large result set. Processing request1 heavily consumer I/O, which is taxing the storage system and memory resources. One or more web servers in the programming system (e.g., application server) might detect this and move request2 to another programming server (even though the other programming server might already be assigned two source code execution requests) so that the programming server has more computing resources, and the client that initiated request2 would not continue to see performance degradation.

In an embodiment, based on monitoring one or more selectability metrics, programming system 100 may select a "stable" programming server to use in generation of a system image file. Programming system may read and serializes the entire state and/or configuration of the selected programming server into data and may store the data into a file, referred herein as "system image." Programming system 100 may use the system image at any point to deploy a new programming server that replicates the state and configuration of the selected programming server.

In an embodiment in which programming system 100 executes on a cloud infrastructure, programming system 100 may request the cloud infrastructure to allocate CPU and memory resources for a new programming server. Once allocated, the programming system may use the system image file to deploy a new programming server.

In one embodiment, programming system 100 monitors server selectability metrics of programming servers and automatically deploys a new programming server from a system image file based on the metrics. By monitoring the server selectability metrics, programming system 100 may determine whether a new programming server is need to alleviate the backlog of source code execution requests or over-subscription of computing resources by the currently executing programming servers. For example, if the average of queue size of source code execution requests for programming servers have exceeded a configurable threshold, programming system 100 may automatically deploy a new programming server to alleviate the load. In an embodiment, programming system 100 may employ performance tuning techniques described above to route source code execution requests from over-burdened programming servers to the newly deployed programming server.

Processing Source Code Execution Requests

Continuing with FIG. 3, at block 330, the application server sends the received source code execution request to the particular programming server as determined at block 320. Additionally, application server 150 may send to the programming server the programming task data for the received source code execution request. Alternatively, the programming server may retrieve programming task data for the source code execution request using the techniques discussed above.

At block 350, the selected programming server receives and processes the source code execution request and generates a source code execution request response. In an embodiment, the response is generated by executing test cases of the programming task using the received instance of source code and evaluating the results of the execution.

To execute the test cases by executing the instance of source code from the received source code execution request, computer programming server 120 invokes a "secure runtime environment," in an embodiment. The term "secure runtime environment" refers to a process, with its own network space, spawned in an operating system of a computer system, such as a programming server. The process runs in a specific environment and can execute source code. The specific environment may include a set of dedicated computing resources and/or an access control separate from an operating system, in which context the process is spawned. Stated differently, a code runner is a special purpose container spawned by a host computer system, such as computer programming server 120.

One or more secure runtime environments, such as secure runtime environment 174, may already be spawned and running on computer programming server 120. Secure runtime environments may also be spawned by computer programming server on-demand, when programming system 100 receives source code for execution. Although, FIG. 1 depicts a single secure runtime environment, secure runtime environment 174, there may be hundreds, or perhaps even thousands of secure runtime environments spawned to execute different source code submissions in parallel on computer programming server 120.

In an embodiment, a programming server of programming system 100 may store different templates images for spawning secure runtime environments such as secure runtime environment 174. A template image may store instructions to configure a particular secure runtime environment when spawned to execute one or more particular type of source codes.

When a source code execution request is received by a programming server, the programming server may examine the request or may retrieve programing task metadata to determine the type of source code instance received. For example, the programming server may determine the source code language of the submitted source code, whether the task is front-end task or a database management system task.

For example, if a database query is received as part of the source code execution request, the programming server that is assigned to the request may determine from the request itself or from the programming task metadata that a database management system environment is to be setup. The programming server may select the pre-configured secure runtime template image for installing and configuring a database management system. By executing the image, the programming server sets up the secure runtime environment with a database management system software running with the environment. The template image may also contain instructions which when executed configure the database management system to create a database instance with necessary database objects and data stored within the objects to execute the database query and return a resulting dataset.

Based on the type of source code, the programming server may select the appropriate secure runtime environment image file to spawn and configure the secure runtime environment. The appropriate secure runtime environment may contain the tools, libraries and initialization scripts to compile (if necessary) and execute the instance of source code received in the source code execution request.

In an embodiment, secure runtime environment 174 loads a compiler for the identified programming language of the submitted source code. Using the compiler, secure runtime environment 174 compiles the modified source code into a computer program. In another embodiment, if the identified programming language for the submitted source code does not require compilation (such as scripting programming languages), then secure runtime environment 174 may not load a compiler for modified source code. In such an embodiment, the modified source code itself is a computer program ready for execution in an appropriate run-time environment.

In an embodiment, secure runtime environment 174 loads an appropriate run-time environment to execute the computer program. Secure runtime environment 174 executes the program using inputs from corresponding test cases and compares the results of the executions with the results in the test cases. Based on the results produced by secure runtime environment 174's execution, the client computer system that submitted the source code is notified whether the modified source code was accurate. In an embodiment, the user interface of the client computer system is updated to reflect the result of the execution.

Computer programming server 120 may spawn a separate secure runtime environment for each programming session to execute source code submitted through the programming session. In another embodiment, computer programming server 120 may spawn a single secure runtime environment for multiple programming sessions and execute source code submissions serially.

In an embodiment, computer programming server 120 may request to stop the execution of a source code in secure runtime environment 174. The request may be triggered by an expiration of maximum allocated time to execute a source code or by the programming session of the source code being terminated. Such a request may cause a termination of secure runtime environment 174 itself.

Upon completion of test case data execution, continuing with FIG. 3, at block 360, secure runtime environment 174 returns the result data of the source code execution request to programming server 120. For example, secure runtime environment 174 may store the result data in a file managed by the hosting operating system that is shared between other processes of programming server 120 and secure runtime environment 174. At block 370, programming server 120 may process the result data or may send the result data to application server 150 to process according to the techniques described in FIG. 4. At block 380, application server 150 may return to the client computer system a response to the source code execution request based on the processing of an evaluation of result data.

Evaluating Results

In an embodiment, source code received by programming system 100 is evaluated based on accuracy and one or more of pre-compile, compile time and run-time metrics, alone or collectively referred herein as "result metrics." These metrics describe one or more numerical values that measure efficiency, quality and robustness of the received source code.

In an embodiment, one or more result metrics are used to rate the solution (submitted source code) implemented by a user for the provided task. The term "solution ratings" refers to one or more numerical values calculated based on collected one or more result metrics for evaluated source code of the programming task and/or based on the complexity of the programing task.

Figure 4:
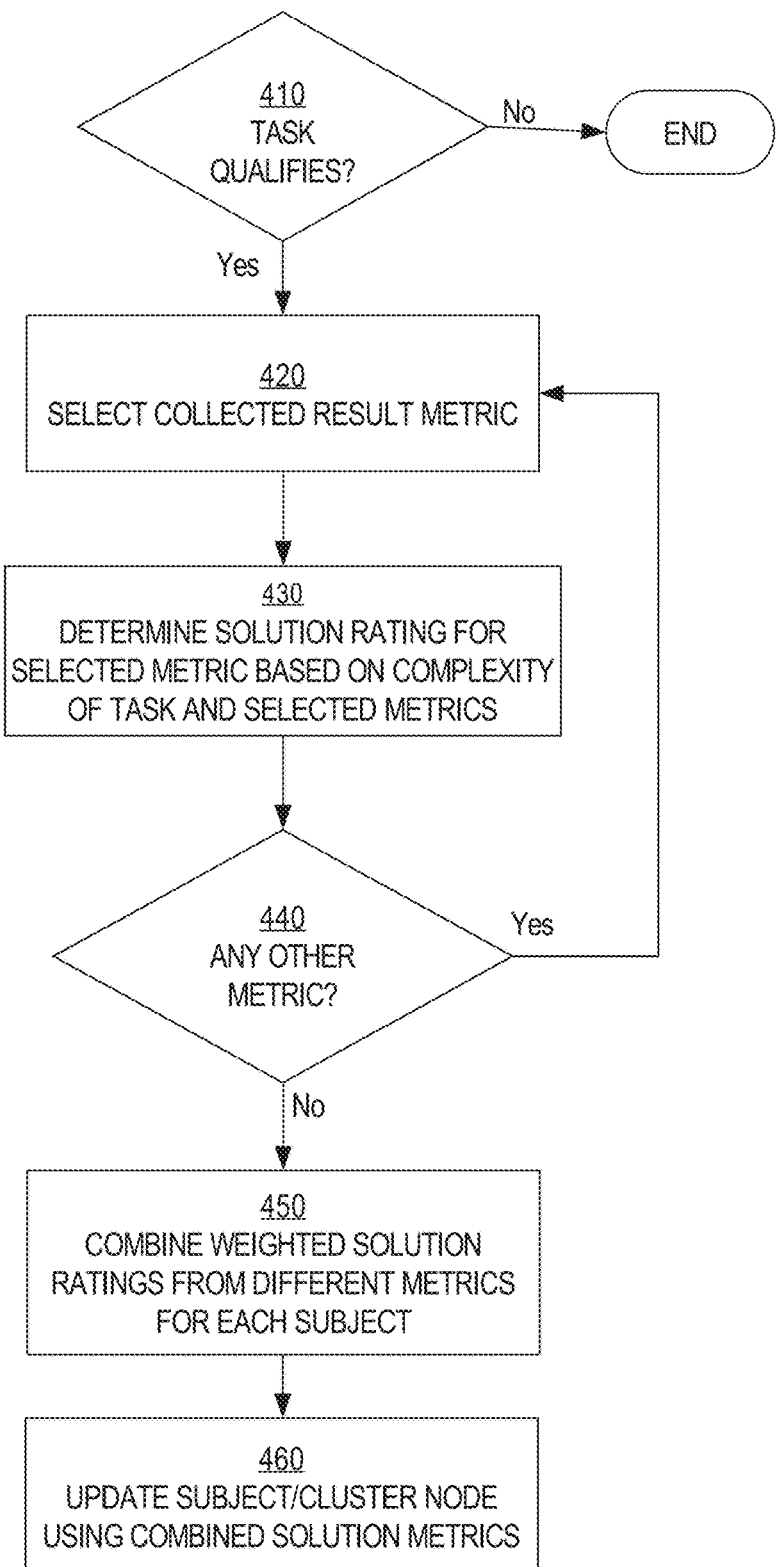
FIG. 4 is a flow diagram that depicts a process for calculating solution rating(s) for a task, in an embodiment.

FIG. 4 is a flow diagram that depicts a process for calculating source code execution request's solution rating(s) for a task, in an embodiment. In one embodiment, to save computing resources, solution rating(s) for the task are calculated, only if the task is in the top complexity of tasks for which the user has previously submitted source code. As long as at least one subject complexity rating for the task at hand meets such criteria, the solution ratings for the task may be calculated. To determine whether the task meets the criteria, at block 410, the process retrieves the subject complexity ratings for the most complex N tasks in the subject area(s) tagged for the task. The process compares the subject complexity ratings of the task with the retrieved previous tasks' subject complexity rating(s). If the current subject complexity rating is not within the previous subject complexity ratings, the process ends, otherwise the process proceeds to block 420. In an alternative embodiment, source code execution request for each task is evaluated regardless of its subject complexity ratings. In such an embodiment, the process starts at block 420.

In another embodiment, an evaluation of the received source code performed during a programming session may depend on the mode of evaluation. Using user interface elements at a client computer system, a user may select the mode for the evaluation for the user's programming session. In an embodiment, if user selected mode is a practice mode and/or arcade mode, only then solution ratings from the collected result metrics over such mode-based programming sessions may affect the user rating. According to such an embodiment, if the selected mode by a user is not a practice mode and/or arcade mode, the process may end without further evaluation of result metrics for the programming session.

At block 420, the process selects one result metric at a time for calculating a corresponding solution rating. For example, the process may first select a particular pre-compile time metric for the task. Non-limiting examples of pre-compile time metrics include result metrics representing programming duration for the source code, code length (such as a number of non-commented lines in the source code or a number of non-commented characters/words in the source code), number of particular operators used (such as JOIN operators in an SQL statement). In an embodiment, programming duration is tracked by a programming system from the time at which a programming task is sent and/or received by the client computer system of the programming session, to the time at which the source code for the programming task is submitted by a user of the programming session at the client computer as a solution for the programming task. Stated differently, the programming duration measures the time duration for a user to program the source code for the programming task. Such time duration is measured from the time of receiving, at the client computer system, user interface elements with the programming task description to the time when the user submits the source code using the user interface elements.

In a related embodiment, a programming duration metric may exclude time periods of inactivity by a user during programming of the source code at a client computer system. The inactivity period may be detected by tracking keystrokes at the client computer system. An inactivity period may be excluded from the metric, if the time duration between keystrokes is detected to be significant.

Another example of a pre-compile time metric is a submission confidence metric. The submission confidence metric may track number of times the user has submitted a source code for the task until successful (accurate source code that passes the test cases of the task). The submission confidence metric may include the number of times the user has selected to test a source code for the task (e.g. by selecting run test control 230 in FIG. 2) before submitting an accurate source code for the task.

Continuing with FIG. 4, at block 430, the user's solution rating for the task may be determined by the selected result metric and in some embodiments based on subject complexity rating(s) of the task. In one embodiment, the selected result metric may determine what portion (if not the whole) of the subject complexity rating(s) of the task to award the user as the corresponding solution rating(s) for the user. In one embodiment, to determine the portion of the subject complexity rating(s) of the task to award, the selected metric may be compared with a configurable threshold for the selected metric. In another embodiment, the selected metric may be compared with an aggregate of selected metrics collected for users for the same task. Non-limiting examples of an aggregate may be an average or a particular percentile.

For example, the task programming duration metric for the user may be compared to the average of programming duration for any user for the same task. If the user's programming duration metric is less than the average programming duration, then the complete subject complexity rating(s) of the task are awarded to the user as the respective solution rating(s) for the task. On the other hand, if the user programming duration metric is more than the average programming duration, then portion of the subject complexity rating(s) for the task corresponding to the difference are awarded to the user as the respective solution rating(s) for the task.

To illustrate this example, an average programming duration for a user to submit an accurate source code for a particular task with subject complexity rating from 600 to 660 may be 9 minutes. However, the particular user may have submitted the accurate source code in 10 minutes rather than 9 minutes. The programming system may scale back the subject complexity rating by the relative amount of underperformance. For example, the solution rating for the user may be calculated by multiplying the ratio of the user programming duration over the average duration, 9/10, with the complexity rating lower and high bounds. Thus, the solution rating awarded to the user may be the 540 to 594 value range.

As another example of a pre-compile time metric, the code length metric may be selected for the task, at block 420. Similarly, at block 430, the code length metric may be compared with a threshold and/or an aggregate code length metric for users for the same task. Based on the comparison, a greater or lesser portion of the subject complexity rating(s) for the task is awarded to the user as a solution rating for the completed task.

As yet another example of a pre-compile metric, at block 420, the submission confidence metric may be selected for the task. The confidence metric represents the number of times a user has requested to test her source code for the task and/or the number of times a user has submitted her source code for the task. At block 430, the confidence metric indicating a greater number of test runs may yield a lesser portion of the subject complexity rating(s) of the task to be awarded to the user as a solution rating(s) for the completed task. Similarly, the confidence metric indicating a greater number of submissions for the task may also yield a lesser portion of the subject complexity rating(s) of the task to be awarded to the user as a solution rating for the completed task. Conversely, a single submission of an accurate source code with no test execution may yield the full subject complexity rating(s) for the task to be awarded to the user as solution rating(s) for the completed task.

In an embodiment in which a subject complexity rating for the task is a range of values, the respective solution rating of the user for the task is also calculated to be in a range of values. The lower bound of the subject complexity rating is used in the calculation for the lower bound of the respective solution rating, and the higher bound of the subject complexity rating is used in the calculation for the higher bound of the respective solution rating.

Additionally or alternatively to the pre-compile time metrics, programming system 100 may also analyze and record the compile-time metrics for the submitted source code. A secure runtime environment invoked to compile the received source code may also track and record the compile-time metrics. Non-limiting examples of the compile time metrics include a number of methods/attributes/classes/packages, depth of inheritance information, and code path permutations.

Additionally or alternatively to the pre-compile time metrics and/or compile time metrics, programming system 100 may also analyze and record the run-time metrics for the submitted source code. A secure runtime environment invoked to compile the received source code may also track and record the run-time metrics. Non-limiting examples of the run-time metrics include a benchmark based evaluation metrics, percentage match with user-interface mock ups metrics, resource consumption metrics including information about a size of memory footprint, an amount of CPU consumption, an amount of I/O usage, and the like.

Continuing with FIG. 4, in one or more embodiments, one or more compile-time or run-time metrics are similarly selected at block 420. At block 430, the selected result metric(s) may use an aggregate of the same metric for other users implementing the same task or a configurable threshold for the task to determine a portion of the subject complexity rating(s) to be awarded to a user as respective solution rating(s).

At block 440, after the process has no other result metric to evaluate, for each subject of the task, the process combines solution ratings calculated from different metrics and assigns the corresponding subject tags to the aggregate solution ratings at block 450, in an embodiment. Each metric may be given a different weight that represents metrics importance in assessing user ratings based on the task. The weights may be applied to the corresponding solution rating for all subject area(s). The process may aggregate the weighted solution ratings for each subject of the task.

Calculating User Rating

In an embodiment, programming system 100 may track user rating for each user. The term "user rating" refers to a numerical value calculated based on evaluations of multiple source codes submitted by the user for multiple programming tasks. Each user has a single user rating maintained by the programming system 100. The user rating for a user may change based on the evaluated solution ratings of the user.

In an embodiment, programming system 100 stores user rating associated with other user data in content database 132.

In an embodiment, if source code submitted by a user in a programming session is accurate (i.e. programming system 100 evaluates the source code to successfully pass the test cases for a programming task), then programming system 100 increases or leaves unchanged the user rating of the user. In an embodiment, the increase depends on the evaluation of the result metrics for the source code by programming system 100. For example, the increase of the user rating is greater if the programming duration was relatively short, and the increase of the rating is lesser if the programming duration is relatively long.

According to one example, programming system 100 may maintain an average time for programming durations for the programming task collected across multiple programming sessions, and may compare the received programming duration to the average programming duration for the programming task to determine the amount of increase, if any.

According to another example, metadata generated for the programming task may include a configurable threshold programming duration value. Programming system 100 may compare the programming duration with the threshold programming duration value to determine the amount of increase, if any.

In an embodiment, a user rating decreases or stays unchanged if source code submitted by a user in a programming session is inaccurate (fails to pass test cases for the programming task as evaluated by programming system 100). The amount of decrease may be similarly based on the complexity of the programming task (the lower the complexity, the greater the decrease) and/or other result metrics evaluated for the source code. Additionally, programming system 100 may allow a user to submit source code multiple times for a single programming task, when the initial source code is inaccurate. Each subsequent submission, if inaccurate, may further decrease or preserve the user rating, while an accurate submission after one or more inaccurate attempts, may increase or preserve the user rating, but by a lesser amount.

Accordingly, in the practice mode, submitting source code for programming tasks may increase, preserve, or decrease a user rating of the submitting user. However, the amount of increase or decrease may depend on the accuracy of the submitted source, complexity of the programming task and result metrics collected for the source code submitted for the programming tasks. In an embodiment, based on similar evaluations, programming system 100 may determine to leave the user rating of a user unchanged.

Similarly to the practice mode, in a programming session with the versus mode selected, programming system 100 may evaluate the submitted source code to either decrease, preserve or increase the user rating of a user in a similar manner. In one embodiment, the user rating is not affected in the versus mode. In another embodiment, the amount of increase or decrease may depend on one or more opposing users participating in the versus mode. Particularly, the amount may depend on the opposing user's user rating. For example, if a user has correctly solved a programming task in fewer attempts and/or faster than an opposing user, then the user's user rating increases in proportion with the difference between the user ratings of the user and the opposing user. By corollary, if the opposing user has correctly solved a programming task in fewer attempts and/or faster than the user, then the user's user rating decreases in proportion to the difference between the user ratings of the user and the opposing user.

Graph-Based Data Representation of Knowledge Map

In an embodiment, based on evaluation of submitted tasks a system may maintain multiple user ratings, specific to particular subject areas of the submitted tasks. For example, programming system 100 maintains multiple user ratings for a user. Thus, when a user submits source code for a programming task, more than one user ratings may change. In such an example, the different user ratings may be based on different subject areas of computer programming such as per programming language. In such an example, programming tasks may be associated with front-end engineering and/or backend engineering, and thus a user may have a separate a front-end user rating and a back-end user rating.

To track user ratings in different subject areas, a task, such as a programming task, is categorized into one or more subject areas to which the task is related, in an embodiment. The subject area(s) of a task are pre-determined based on perceived knowledge required for a user to solve the task. Task data, such as programming task data stored in repository 142, may include tags describing each of the related subject areas of the task.

In an embodiment, to accurately evaluate a user rating in one or more subject areas, a graph of nodes is associated with the user. In such a graph of nodes, a node represents a subject area (or simply "subject"), for which a user is rated. A node may be connected to other nodes representing other subject areas. The nodes in the graph of nodes are assigned values based on known user ratings and unknown user ratings for respective subject areas. For convenience, the term "node" and the term "subject" are used interchangeably herein, and, thus, a subject may be simply referred herein as a "node" and vice versa.

The relatedness of the connected entities is described in the graph of nodes by an edge between the connected nodes, in an embodiment. In an embodiment, the relatedness of the nodes is configurable based on the relatedness of the subject areas that the nodes represent. The relatedness of the nodes may be configured by a special user, such as an administrator, using a graphical user interface.

Using the graph of nodes, a rating for an unknown rating subject for a user may be determined using connected node rating(s), in an embodiment. With the knowledge of relatedness, a node value of a node in the graph of nodes is updated based on the propagation of the node values of its connected nodes.

The weight of the propagation for a connected node value may be configurable based on the relatedness of the connected subject areas. The measure of relatedness may be represented by an edge value of the edge connecting the nodes. The higher the edge value, the more related and influential the connected node is on the node value, in an embodiment.

Figure 5:
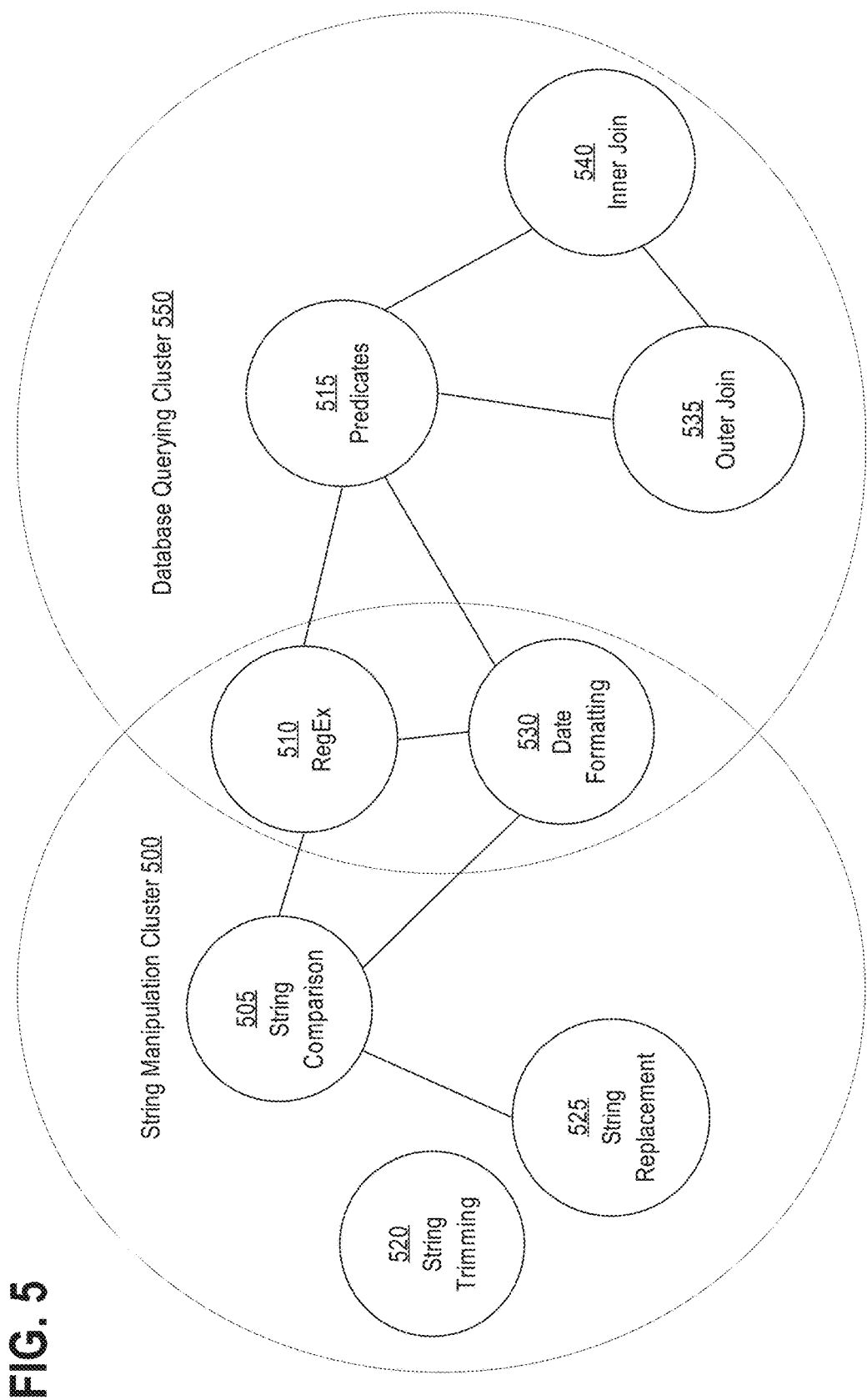
FIG. 5 is a block diagram that depicts an example of graph of nodes for subject areas, in an embodiment.

FIG. 5 is a block diagram that depicts an example of graph of nodes for subject areas, in an embodiment. "String comparison" node 505 is related to "RegEx" node 510 because there is an overlap of skills necessary to solve a task in the "string comparison" subject area and a task in the "RegEx" subject area. Accordingly, a user, who has not completed a task in "RegEx" but has completed a task in the "string comparison" subject area, may have her user rating for "string comparison" node 505 be propagated to the "RegEx" node 510. Similarly, the "string comparison" subject area is related and thus, connected to "string replacement", node 525, and "date formating", node 530. "Date formatting" and "RegEx", nodes 510 and 530 respectively, are also related and thus, connected to the "predicate" subject area of database queries, node 515. For that reason, if a user solves a task that is in subject area of database query predicates, the evaluation of the task may also affect "RegEx" node 510 and "date formatting" node 530. The "predicate" subject area, node 515, is also related and thus, connected to the "outer join" and "inner join" subject areas in database queries, nodes 535 and 540, respectively. On the other hand, the "string trimming" subject area is unrelated to any other subject areas depicted in FIG. 5. Thus, "string trimming" node 520 is not connected to any other node depicted in FIG. 5.

Sets of graph nodes may be aggregated together into a cluster to represent the encompassing general subject area of more specific subject areas. In an embodiment, a cluster for a general subject area is configurable to include graph nodes of respective subject areas that make up the general subject area.

Since one or more specific subject areas may be shared between general subject areas, the clusters may have common nodes. In an embodiment, a cluster for a user is associated with a rating that represents an aggregation of node values of the cluster using one or more aggregation methods (such as average, minimum, maximum, standard deviation . . . ).

A user cluster rating may directly be affected by an evaluation of a task. Rather than or in addition to being directed to a specific subject area, a task may also apply to a particular general subject area. For example, a task that can be solved using the knowledge from multiple different subject areas may qualify to affect the general subject area itself. A user solving such task may affect the rating of a cluster for the general subject area.

FIG. 5 depicts examples of two clusters for two different yet inter-related general subject areas, in an embodiment. "String manipulation" cluster of nodes 500 represents the same named general subject area that contains the string manipulation related specific subject areas such as string comparisons, RegEx, string trimming, string replacement and date formatting, nodes 505, 510, 520, 525, 530, respectively. The other cluster, "Database Querying" cluster 550 contains specific subject area nodes that are within the database querying general subject area. The two clusters are inter-related (and thus, overlap) because at least two nodes, "Regex" node 510 and "date formatting" 530 belong to both cluster 500 and 550 and represent subject areas shared between the general subject areas of the clusters.

Clusters may be configured by a special user, such as an administrator, using a graphical user interface.

To obtain a user rating for a cluster, the user ratings for each of the nodes in the cluster are aggregated using an aggregation function such as an average or weighted average. In another embodiment in which a cluster may independently have a user rating, the cluster's user rating may be further aggregated with the user rating aggregated from the nodes of the cluster.

Updating Graph of Nodes

In an embodiment, the graph of nodes that is associated with a user may be initialized with node values equal to default subject complexity ratings. In another embodiment, the graph of nodes that is associated with a user may be uninitialized until the user submits first source code request which results in at least one solution rating.

Continuing with FIG. 4, at block 460, the process updates the user rating values based on solution ratings for each node or cluster that matches the associated subject tag.

In an embodiment, a new user rating for a node or cluster is calculated by aggregating the user rating with the newly evaluated solution rating for the same subject tag. For example, the aggregation may be based on pure average or weighted average or any other statistical method for aggregating values.

In an alternative embodiment, the new user rating for a node or cluster is calculated by aggregating the past N-number of received solution rating with the newly evaluated solution rating for the same subject tag of the node or cluster. In such an embodiment, the system maintains the past N-number of solution rating received for the same node/cluster (subject tag). The aggregation of newly received and historical solution ratings may user pure average or weighted average. In the weighted average example, the weights for the solution ratings may be decreasing in chronological order, with a more current solution rating having a higher weight than a less current solution rating.

In yet another alternative embodiment, the new user rating for a node or cluster is overwritten by the newly evaluated solution rating for the same subject tag of the node or cluster.

A change in user rating value for a node in a graph of nodes may affect a connected node. In an embodiment, a user associated with a graph of nodes has submitted source code for task related to a node and as a result has received a user rating for that node. However, the same user has not submitted any source code for evaluation to affect the subject area of the node connected to the original node. Since the user's source code has affected the original node, the original node's user rating may be propagated to the connected node and thus user may acquire a rating for a related subject area without submitting source code in that subject area. The scale of user rating propagation may be based on configurable weight for each edge in the graph of nodes.

In another embodiment, even if the connected node has a user rating for the user, the original node's user rating change may still be propagated to the connected node but to a lesser degree. The degree of propagation may also be configurable using the weight associated with the edge of connected nodes.

In an embodiment, upon the update of the original node, the connected nodes may be traversed and modified based on the new value of the original node.

Evaluation in a Bot Mode

In an embodiment, in the bot mode, a source code submitted by a user is evaluated by programming system 100 based on a comparison between submitted source code result metrics and result metrics of a selected bot. At a client computer system, a user may select a particular bot from user interface elements received from programming system 100. Upon submission of user source code for a programming task associated with the selected bot, the user's source code submission is evaluated similarly to the evaluation performed in the practice mode. The user source code result metrics may be compared with the result metrics of the selected bot. The result metrics of the selected bot may have been collected for the same programming task.

In an embodiment, result metrics of a bot are collected during the training bot mode of programming system 100. One or more users of an entity associated with a bot ("entity user") may establish programming sessions with programming system 100 to submit source code for one or more programming tasks associated with the bot. For example, a bot may be associated with a corporate entity. The developers associated with a corporate entity may establish programming sessions with programming system 100 to solve programming tasks similar to the programming tasks implemented by the developers as part of their employment with the corporate entity.

The programming tasks associated with the bot may be specifically designed to be similar to programming tasks handled by the entity. In an embodiment, programming system 100 evaluates source code submissions of the programming sessions of the entity users, and records the generated result metrics in association with the bot identification data in content database 132.

Programming system 100 may maintain an entity rating for an entity. The entity ratings may be based on averages of user ratings of entity users.

In one embodiment, to maintain entity ratings, programming system 100 maintains a graph of nodes for entity ratings associated with the entity. Similar to the graph of nodes for user ratings, each node represents a rating for a subject area and may be part of one or more clusters of nodes that represent ratings for general subject areas.

Using the techniques described herein, an entity user submission for a task, in the training mode, generates result metrics and thus, affects one or more nodes and cluster ratings associated with the task's subject areas. Entity user may submit source codes for a variety of programming tasks (associated with the entity and not associated with the entity). In some embodiments, programming task in a training mode, for which an entity user submits a source code, may not be the same exact programming task that is presented to a user in the bot mode. However, the programming task may have one or more of the same subject area (and associated subject tags) as the programming task presented to the user in the bot mode.

In an embodiment, rather than maintaining a graph of nodes for each entity user, the programming system maintains only a single graph of nodes for an entity/bot as part of result metrics of the entity's bot. Thus, the evaluation of source code submissions by any users of the entity affects only the graph of nodes of that entity. The submissions thus effectively train the bot of that entity by generating/updating the graph of nodes of the entity, in such an embodiment.

In an embodiment, bot's graph of nodes is used to evaluate a user code submission for the programming task in the bot mode. Upon the receipt of source code from a programming session of the user in the bot mode, programming system 100 evaluates the source code against the selected bot for the programming session. Programming system 100 may retrieve the bot's entity ratings for the one or more subject areas of the programming task from the bot's graph of nodes. Programming system 100 evaluates the user submitted source code to generate solution rating(s) using the techniques discussed above. Programming system 100 compares the generated user solution ratings with the retrieved bot ratings for the one or more nodes of the bot graph that match the subject areas of the programming task. Based on the comparison, programming system 100 determines whether the user's source code submission is successful over the bot for the programming task.

In an embodiment, one or more solution ratings for bots are determined for a programming task in the bot mode and compared to the corresponding one or more solution ratings of the submitted source code. The solution rating for a bot for a programming task is determined by the bot's entity rating in subject area(s) related to the programming task and the subject complexity ratings of the programming task in the same subject areas. The solution rating may depend on the difference between the subject complexity rating and the bot's entity rating. If the bot entity rating is greater than the programing task's subject complexity rating, then the bot is assigned a solution rating equal to the task's subject complexity rating. Otherwise, the bot's solution rating may be based on the difference between the complexity rating and the bot entity rating or solely on the bot entity rating. Programming system 100 compares the generated user solution ratings with the determined bot solution ratings for the one or more subject areas of the programming task. Based on the comparison, programming system 100 determines whether the user's source code submission is successful over the bot for the programming task. In an embodiment, in which the programming task has multiple subject complexity ratings, the success of the submission is determined based on aggregation of results for each of the subject areas.

Alternatively or additionally to maintaining a graph of nodes for an entity, programming system 100 may record the number of times the developers submitted accurate source code, the number of times the developers submitted inaccurate source code and/or skipped a programming task. Programing system 100 may also record programming durations for source code that passes test cases for a programming task. Accordingly, for a specialized programming task, programming system 100 may record the number of total submissions by the developers for the programming task (totalCount), the number of accurate submissions (correctCount), the number of inaccurate submissions (wrongCount), and programming durations for accurate submissions. With each accurate source code submission to programming system 100, an average programming duration for the programming task (avgAnswerTime) may be recalculated, based on the new programming duration (answerTime) for the source code, using the following equation:

$$\text{avgAnswerTime}=(\text{avgAnswerTime}*\text{correctCount}+\text{answerTime})/(\text{correctCount}+1). \quad (1)$$

Programming system 100 may maintain probability metrics for a bot. In an embodiment, the probability metrics describes the probabilities with which user(s), associated with the entity of the bot, submitted accurate source code for a programming task as evaluated by programming system 100. For example, probability of accurate source code (Pcorrect) for a bot may be represented by the following equation:

$$P\text{correct}=\text{correctCount}/\text{totalCount}. \quad (2)$$

The probability for inaccurate source code for a programming task (Pwrong) may be represented by the following equation:

$$P\text{wrong}=\text{wrongCount}/\text{totalCount}. \quad (3)$$

The probability for skipping a programming task (Pskip) may be represented by the following equation:

$$P\text{skip}=1-P\text{correct}-P\text{wrong}. \quad (4)$$

In an embodiment, bot's probability and programming duration metrics for a programming task are used to evaluate a user code submission for the programming task in the bot mode. Upon the receipt of source code from a programming session of the user in the bot mode, programming system 100 evaluates the source code against the selected bot for the programming session. Programming system 100 may retrieve the bot's result metrics for the programming task from content database 132. Programming system 100 evaluates the source code to generate result metrics for the user submission. Using the generated result metrics, programming system 100 compares the generated result metrics with the retrieved metrics for the bot for the programming task. Based on the comparison, programming system 100 determines whether the user's source code submission is successful over the bot for the programming task.

In an embodiment, programming system 100 introduces a random deviation to the retrieved metrics for the bot and modifies the retrieved metrics by the deviation. Programming system 100 may compare the modified metrics of the bot with the generated result metrics for the source code submitted by the user to determine whether the user source code is successful over the bot.

Continuing with the corporate entity bot example, programming system 100 retrieves the source code accuracy probabilities for the bot for the programming task to evaluate against the user source code accuracy for the programming task. Based on the probabilities, programming system 100 determines whether the company bot is accurate, inaccurate or has skipped the programming task. If the user source code submission for the programming task is accurate while the company bot is determined to be inaccurate (or has skipped) the programming task, then programming system 100 determines that the user's submission is successful over the company bot for the programming task. If for the programming task both the user source code submission and the company bot are accurate, then programming system 100 may evaluate additional result metrics such as programming duration metrics of the user submission against the average programming duration of the bot.

Programming system 100 may also modify the average programming duration metric of the bot by applying a random deviation to the metric. For example, if the user's programming duration is shorter than the (modified) average programming duration metric of the bot, than the programming system evaluates the user's submission as successful over the bot for the programming task. In other scenarios, in which either the user's submission is inaccurate or has greater programming duration, programming system 100 evaluates the user's submission as unsuccessful over the bot for the task.

Providing Results

Programming system 100 may provide the result data of a source code execution request for a programming task to a user upon the evaluation. In one embodiment, program system 100 may send the accuracy information of the source code execution request to a user computer system to display on the user interface. In another embodiment, program system 100 may cause the client computer system to display the evaluated one or more solution ratings for the programming task on a user interface of the user computer system. After receiving an accurate source code execution request for a programming task, programming system 100 may make available to the user other one or more instances of source codes that were submitted by other users and have been evaluated to be accurate.

In an embodiment, programming system 100 may receive a request to display user rating information for a user. To provide a user with the information about user's progress in programming quality, programming system 100 may cause user's computer system to display user rating. Additionally, programming system 100 may provide to the user's computer system user interface elements that describe user rating(s) for each of the subject area. The user interface elements may include a presentation of graph of nodes associated with the user that provides information on the user's subject rating and the corresponding subject area. One or more user ratings may be stored and provided to a user interface as a value range. The user interface elements may further describe relative ranking of the overall user's rating or the rating for a specific subject area/node, or a cluster.

In an embodiment, programming system 100 provides a user with an ability to provide user information that is in addition to one or more user ratings determined by programming system 100. User information may include education and experience of the user. User information may further include current preferences of the user: whether the user is actively seeking an employment opportunity, a type of role the user seeks for an employment, relocation preferences, work authorization information, whether the user is a student or a new graduate. Programming system 100 may store user information in association with the one or more user ratings of a user.

In an embodiment, programming system 100 may provide users associated with entities an ability to request user rating information of users which may include contact information of the user. An entity user or an entity representative may request programming system 100 to provide user ratings for users by specifying one or more criteria. One or more criteria may include one or more of: a subject area, a minimum or maximum user rating, a maximum range for a user rating value, a geographic location of user, a tenure of using programming system 100, a success over one or more bots. For example, using one or more user interface elements, an entity user/representative requests user ratings for users in a specific subject area or a cluster. Programming system 100 may provide the requested user ratings for one or more users that match the one or more criteria to be displayed on a user interface of the requesting entity user/representative. Programming system 100 may provide an ability for an entity user/representative to communicate to the users whose user ratings have been provided. In an embodiment, an entity user/representative may configure the one or more criteria for receiving user ratings. Programming system 100 may automatically send a notification to the entity user/representative when one or more user ratings of one or more users and/or related information are detected to meet the configured criteria. The notification may include user ratings and information to communicate with the users.

Cloud Computing Overview

The techniques described herein are implemented using one or more processing solutions, examples of which include distributed systems, clustered computing systems, and cloud computing systems. In an embodiment, a computer programming evaluation system may be part of a cloud computing system. A cloud computing system implements one or more of: cloud storage, cloud processing, cloud communication, and any other kind of cloud computing service. Further, cloud computing systems may operate under a pay-for-what-you-use-as-you-use-it model, under a fixed subscription model, etc. In this embodiment, any part (or all) of the functionality attributed to the programming system, or to other entities within this description, is controllable via an interface that is exposed at a cloud computing system.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
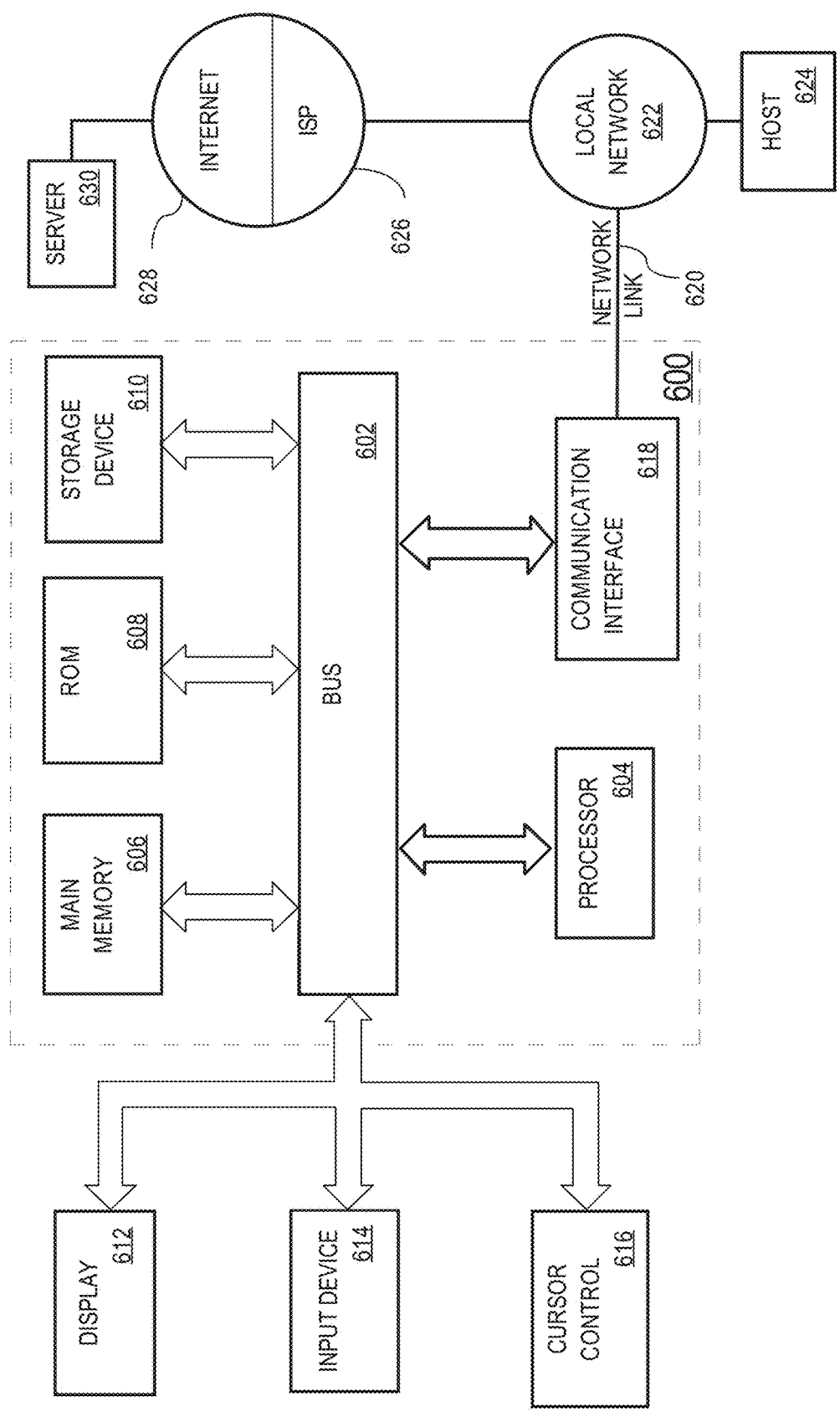
FIG. 6 is a block diagram that illustrates a computer system 600 upon which an embodiment of the presented approach may be implemented.

For example, FIG. 6 is a block diagram that illustrates a computer system 600 upon which an embodiment of the approach may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

Various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art will realize that embodiments of the disclosure may be practiced without the use of these specific details. In other instances, well-known structures and processes are not shown in block diagram form in order not to obscure the description of the disclosure with unnecessary detail. Thus, the present disclosure is not intended to be limited to the embodiments shown, but is to be accorded the widest scope consistent with the principles and features disclosed herein.

In the foregoing specification, embodiments of the presented approach have been described with reference to numerous specific details that may vary from implementation to implementation. The specification and drawings are, accordingly, to be regarded in an illustrative rather than a restrictive sense. The sole and exclusive indicator of the scope of the presented approach, and what is intended by the applicants to be the scope of the presented approach, is the literal and equivalent scope of the set of claims that issue from this application, in the specific form in which such claims issue, including any subsequent correction.

What is claimed is:

1. A computer-implemented method comprising:
   establishing multiple con-current programming sessions initiated by a plurality of client computer systems;
   receiving a first source code execution request from a first con-current programming session of the multiple con-current programming sessions, the first source code execution request comprising a first instances of source code;
   receiving a second source code execution request from a second con-current programming session of the multiple con-current programming sessions, the second source code execution request comprising a second instance of source code;
   determining, based at least on load balancing of source code execution requests among a plurality of programming computer servers, to process on a first programming computer server, of the plurality of programming computer servers, the first source code execution request from the first con-current programming session and to process on a second programming computer server, of the plurality of programming computer servers, the second source code execution request from the second con-current programming session;

executing the first instance of source code by the first programming computer server concurrently with executing the second instance of source code by the second programming computer server, wherein, regardless of content of the first instance of source code, the executing the first instance of source code by the first programming computer server can only access a configured set of resources;

monitoring one or more server selectability metrics for the plurality of programming computer servers;

based on the one or more server selectability metrics for the plurality of programming computer servers, determining to deploy a new programming computer server;

deploying the new programming computer server based on an image of a specific programming computer server;

wherein the specific programming computer server has been previously determined to be stable.

2. The method of claim 1, wherein the determining to execute the first source code execution request on the first programming computer server causes selecting the second programming computer server, of the plurality of programming computer servers, to process the second source code execution request from the second con-current programming session.

3. The method of claim 1, further comprising:
monitoring one or more server selectability metrics for the first programming computer server;

comparing the one or more server selectability metrics of the first programming computer server to one or more server selectability metrics of one or more other programming computer servers of the plurality of programming computer servers;

based on the comparing, determining to process the first source code execution request on the first programming computer server.

4. The method of claim 3, wherein the one or more server selectability metrics for the first programming computer server are based on one or more of: a current number of source code requests in a server queue of source code requests for the first programming computer server, an average number of source code requests in the server queue of source code requests for the first programming computer server, a length of time period for returning a result for one or more latest source code execution requests or an error rate of execution of instances of source code on the first programming computer server.

5. The method of claim 1, wherein each of the plurality of programming computer servers is configured to execute specific one or more types of source code.

6. The method of claim 1, further comprising:
maintaining a first queue of the source code execution requests to be processed by the first programming computer server, wherein each entry in the first queue is processed in a specified order of insertion;

in response to determining, based at least on load balancing of the source code execution requests among the plurality of programming computer servers, to process on the first programming computer server, of the plurality of programming computer servers, the first source code execution request, inserting a particular entry for the first source code execution request into the first queue;

wherein prior to the inserting the particular entry into the first queue, the first queue already contains one or more previous entries for one or more previously received source code execution requests; and performing the executing the first instance of source code by the first programming computer server after the one or more previously received source code execution requests have been processed by the first programming computer server.

7. The method of claim 1 further comprising:
maintaining a plurality of template images of run-time environments, wherein each template image is configured to execute one or more types of source code;

based on a particular type of the first instance of source code, determining to select a particular template image of a particular run-time environment from the plurality of template images;

executing the particular template image to setup the particular run-time environment on the first programming computer server.

8. The method of claim 7, wherein the particular template image stores instructions to configure the particular run-time environment to have only access to the configured set of resources.

9. The method of claim 7, wherein the particular template image stores instructions to configure the particular run-time environment with one or more compilation tools for compiling the particular type of the first instance of source code.

10. The method of claim 7, further comprising:
executing the first instance of source code by the first programming computer server by executing the first instance of source code in the particular run-time environment;

in response to a request to stop executing the first instance of source code, terminating execution of the particular run-time environment which causes the executing the first instance of source code by the first programming computer server to stop.

11. The method of claim 7, further comprising:
executing the first instance of source code by the first programming computer server by executing the first instance of source code in the particular run-time environment;

in response to completion of the executing the first instance of source code in the particular run-time environment, terminating execution of the particular run-time environment which causes the executing the first instance of source code by the first programming computer server to stop.

12. The method of claim 7, wherein:
the particular type of the first instance of source code is a data base query, the particular template image includes instructions to configure a database management system, the first source code execution request includes one or more queries to set up one or more database objects;

the method further comprises:
executing the particular template image to setup the particular run-time environment on the first programming computer server causing the database management system to run in the particular run-time environment;

executing the first instance of source code by the first programming computer server at least by requesting the database management system to execute the one or more queries to setup the one or more database objects.

13. A computer-implemented method comprising:
  establishing multiple con-current programming sessions initiated by a plurality of client computer systems;
  receiving a first source code execution request from a first con-current programming session of the multiple con-current programming sessions, the first source code execution request comprising a first instances of source code;
  receiving a second source code execution request from a second con-current programming session of the multiple con-current programming sessions, the second source code execution request comprising a second instance of source code;
  determining, based at least on load balancing of source code execution requests among a plurality of programming computer servers, to process on a first programming computer server, of the plurality of programming computer servers, the first source code execution request from the first con-current programming session and to process on a second programming computer server, of the plurality of programming computer servers, the second source code execution request from the second con-current programming session;
  executing the first instance of source code by the first programming computer server concurrently with executing the second instance of source code by the second programming computer server, wherein, regardless of content of the first instance of source code, the executing the first instance of source code by the first programming computer server can only access a configured set of resources;
  maintaining a queue of the source code execution requests to be processed by the plurality of programming computer servers, wherein each entry in the queue is processed in an order of insertion into the queue;
  after receiving the first source code execution request from the first con-current programming session of the multiple con-current programming sessions, inserting an entry into the queue for the first source code execution request;
  after receiving the second source code execution request from the second con-current programming session of the multiple con-current programming sessions, inserting an entry into the queue for the second source code execution request.

14. The method of claim 13, wherein the determining to execute the first source code execution request on the first programming computer server causes selecting the second programming computer server, of the plurality of programming computer servers, to process the second source code execution request from the second con-current programming session.

15. The method of claim 13, further comprising:
  monitoring one or more server selectability metrics for the first programming computer server;
  comparing the one or more server selectability metrics of the first programming computer server to one or more server selectability metrics of one or more other programming computer servers of the plurality of programming computer servers;
  based on the comparing, determining to process the first source code execution request on the first programming computer server.

16. The method of claim 15, wherein the one or more server selectability metrics for the first programming computer server are based on one or more of: a current number of source code requests in a server queue of source code requests for the first programming computer server, an average number of source code requests in the server queue of source code requests for the first programming computer server, a length of time period for returning a result for one or more latest source code execution requests or an error rate of execution of instances of source code on the first programming computer server.

17. The method of claim 13, further comprising:
  maintaining a plurality of template images of run-time environments, wherein each template image is configured to execute a one or more types of source code;
  based on a particular type of the first instance of source code, determining to select a particular template image of a particular run-time environment from the plurality of template images;
  executing the particular template image to setup the particular run-time environment on the first programming computer server.

18. A server computer system comprising:
  one or more processors;
  one or more storage media storing one or more computer programs for execution by the one or more processors, the one or more computer programs comprising a set of instructions for:
    establishing multiple con-current programming sessions initiated by a plurality of client computer systems;
    receiving a first source code execution request from a first con-current programming session of the multiple con-current programming sessions, the first source code execution request comprising a first instances of source code;
    receiving a second source code execution request from a second con-current programming session of the multiple con-current programming sessions, the second source code execution request comprising a second instance of source code;
    determining, based at least on load balancing of source code execution requests among a plurality of programming computer servers, to process on a first programming computer server, of the plurality of programming computer servers, the first source code execution request from the first con-current programming session and to process on a second programming computer server, of the plurality of programming computer servers, the second source code execution request from the second con-current programming session;
    executing the first instance of source code by the first programming computer server concurrently with executing the second instance of source code by the second programming computer server, wherein, regardless of content of the first instance of source code, the executing the first instance of source code by the first programming computer server can only access a configured set of resources;
    monitoring one or more server selectability metrics for the plurality of programming computer servers;
    based on the one or more server selectability metrics for the plurality of programming computer servers, determining to deploy a new programming computer server;
    deploying the new programming computer server based on an image of a specific programming computer server;
    wherein the specific programming computer server has been previously determined to be stable.

19. The server computer system of claim 18, wherein the set of instructions includes instructions for determining to execute the first source code execution request on the first programming computer server cause selecting the second programming computer server, of the plurality of programming computer servers, to process the second source code execution request from the second con-current programming session.

20. The server computer system of claim 18, the set of instructions includes instructions for:
monitoring one or more server selectability metrics for the first programming computer server;
comparing the one or more server selectability metrics of the first programming computer server to one or more server selectability metrics of one or more other programming computer servers of the plurality of programming computer servers;
based on the comparing, determining to process the first source code execution request on the first programming computer server.

21. The server computer system of claim 20, wherein the one or more server selectability metrics for the first programming computer server are based on one or more of: a current number of source code requests in the server queue of source code requests for the first programming computer server, an average number of source code requests in the server queue of source code requests for the first programming computer server, a length of time period for returning a result for one or more latest source code execution requests or error rate of execution of instances of source code on the first programming computer server.

22. A server computer system comprising:
one or more processors;
one or more storage media storing one or more computer programs for execution by the one or more processors, the one or more computer programs comprising a set of instructions for:
establishing multiple con-current programming sessions initiated by a plurality of client computer systems;
receiving a first source code execution request from a first con-current programming session of the multiple con-current programming sessions, the first source code execution request comprising a first instances of source code;
receiving a second source code execution request from a second con-current programming session of the multiple con-current programming sessions, the second source code execution request comprising a second instance of source code;
determining, based at least on load balancing of source code execution requests among a plurality of programming computer servers, to process on a first programming computer server, of the plurality of programming computer servers, the first source code execution request from the first con-current programming session and to process on a second programming computer server, of the plurality of programming computer servers, the second source code execution request from the second con-current programming session;
executing the first instance of source code by the first programming computer server concurrently with executing the second instance of source code by the second programming computer server, wherein, regardless of content of the first instance of source code, the executing the first instance of source code by the first programming computer server can only access a configured set of resources;
maintaining a queue of the source code execution requests to be processed by the plurality of programming computer servers, wherein each entry in the queue is processed in an order of insertion into the queue;
after receiving the first source code execution request from the first con-current programming session of the multiple con-current programming sessions, inserting an entry into the queue for the first source code execution request;
after receiving the second source code execution request from the second con-current programming session of the multiple con-current programming sessions, inserting an entry into the queue for the second source code execution request.

23. The server computer system of claim 22, wherein the set of instructions includes instructions for determining to execute the first source code execution request on the first programming computer server causes selecting the second programming computer server, of the plurality of programming computer servers, to process the second source code execution request from the second con-current programming session.

24. The server computer system of claim 22, wherein the set of instructions includes instructions for:
monitoring one or more server selectability metrics for the first programming computer server;
comparing the one or more server selectability metrics of the first programming computer server to one or more server selectability metrics of one or more other programming computer servers of the plurality of programming computer servers;
based on the comparing, determining to process the first source code execution request on the first programming computer server.

25. The server computer system of claim 24, wherein the one or more server selectability metrics for the first programming computer server are based on one or more of: a current number of source code requests in a server queue of source code requests for the first programming computer server, an average number of source code requests in the server queue of source code requests for the first programming computer server, a length of time period for returning a result for one or more latest source code execution requests or an error rate of execution of instances of source code on the first programming computer server.

26. The server computer system of claim 22, wherein the set of instructions includes instructions for:
maintaining a plurality of template images of run-time environments, wherein each template image is configured to execute one or more types of source code;
based on a particular type of the first instance of source code, determining to select a particular template image of a particular run-time environment from the plurality of template images;
executing the particular template image to setup the particular run-time environment on the first programming computer server.

* * * * *